UNITED STATES PATENT OFFICE.

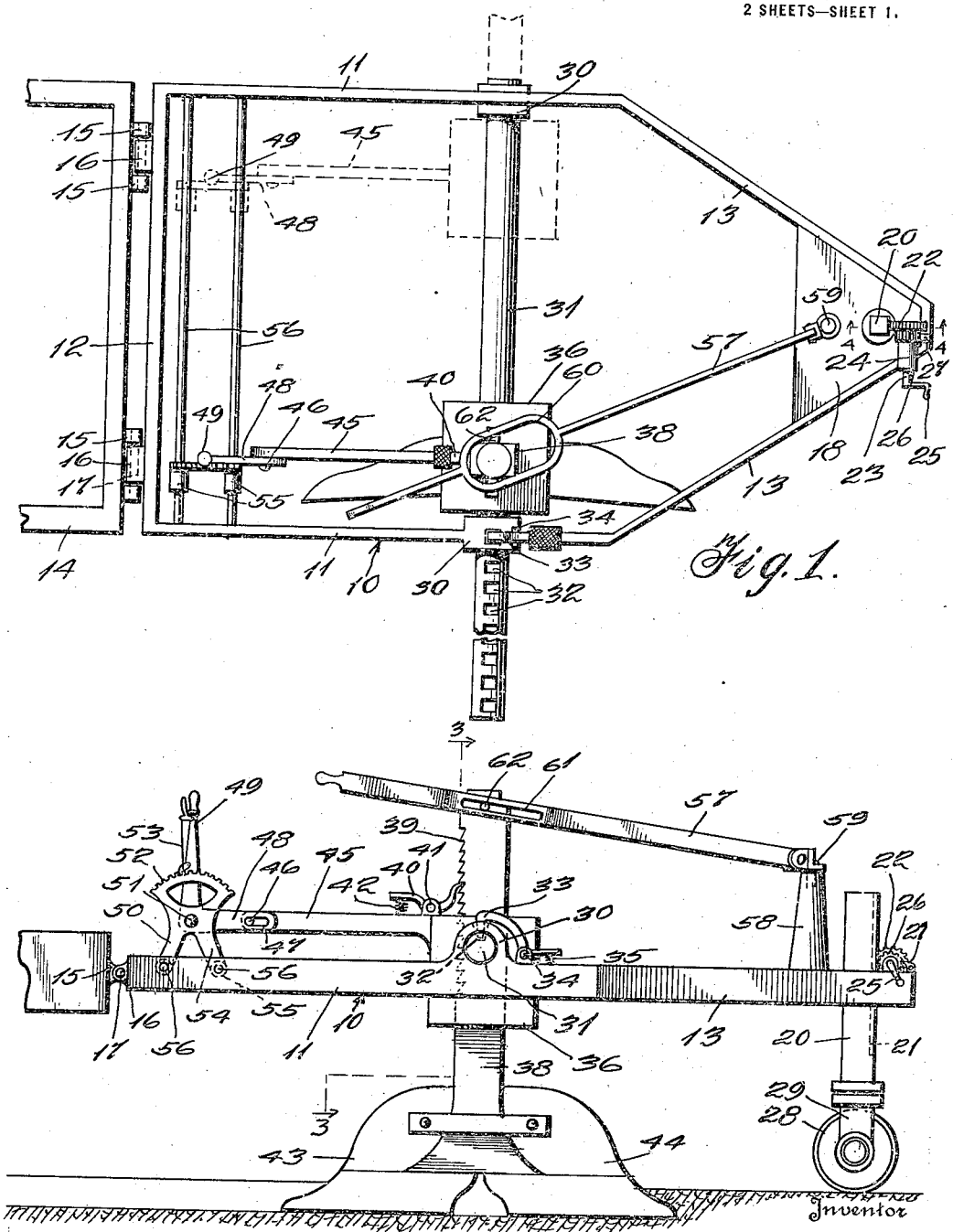

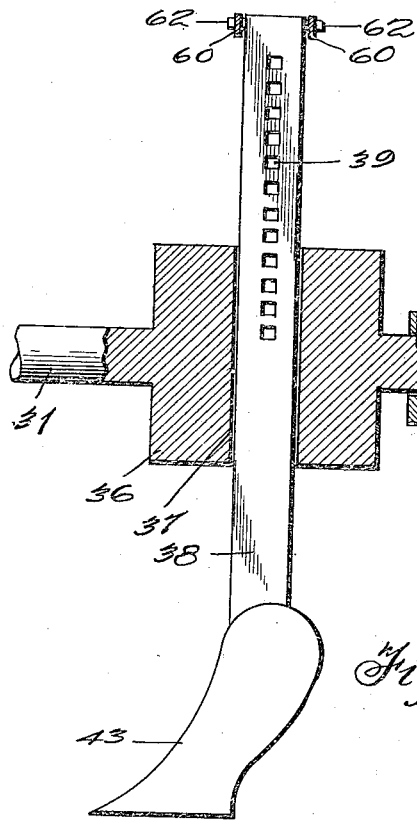
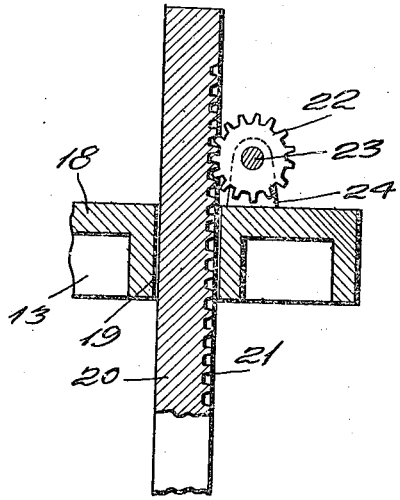
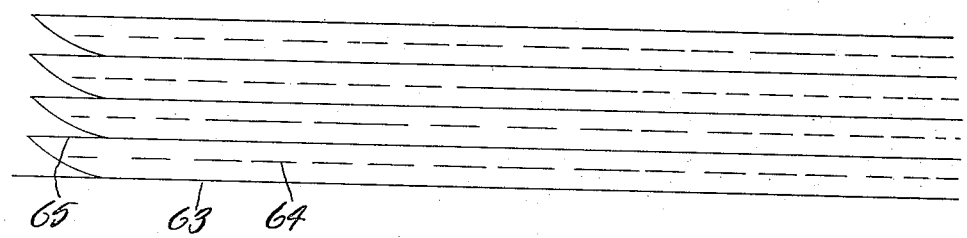

JACOB P. HAFFNER, OF HOWARDSVILLE, VIRGINIA.

PLOW.

1,243,833.  Specification of Letters Patent.  Patented Oct. 23, 1917.

Application filed October 21, 1916. Serial No. 126,949.

*To all whom it may concern:*

Be it known that I, JACOB P. HAFFNER, a citizen of the United States, residing at Howardsville, in the county of Albemarle and State of Virginia, have invented certain new and useful Improvements in Plows, of which the following is a specification.

My invention relates broadly to improvements in plows, adapted for use upon hill sides while the same may be used upon level land, and has specific reference to a plow of the above mentioned character, which is adapted to be moved longitudinally in opposite directions across the land without being turned around, thus saving considerable time and labor, particularly where the plow is propelled by a tractor, as it is difficult and time consuming to turn a tractor around upon level land, and more so, upon a hill side.

An important object of the invention is to provide a plow of the above mentioned character, which is simple in construction, inexpensive to manufacture, and highly convenient in use.

Other objects and advantages of the invention will be apparent during the course of the following description.

In the accompanying drawings forming a part of this specification and in which like numerals are employed to designate like parts throughout the same, Figure 1 is a plan view of a plow embodying the invention, Fig. 2 is a side elevation of the same, Fig. 3 is a vertical sectional view taken on line 3—3 of Fig. 2, Fig. 4 is a detail section taken on line 4—4 of Fig. 1, and, Fig. 5 is a diagrammatic view showing the travel of the plow.

In the drawings, wherein for the purpose of illustration is shown a preferred embodiment of my invention, the numeral 10 designates the frame of my plow, as a whole, comprising longitudinal side beams 11, a front transverse beam 12 and diagonal rear beams 13, forming a rear tapered end, as shown.

The numeral 14 designates the frame of a tractor, such as a bull tractor, while any suitable form of tractor may be employed. This tractor frame 14 is provided with knuckles 15, receiving therebetween knuckles 16, carried by the front beam 12. These knuckles are pivotally connected by means of pintles or pins 17. It is thus apparent that coupling means has been provided between the tractor frame 14 and the plow frame 10, which will permit the tractor pulling or pushing the plow frame, it being understood that the tractor is not turned around when the end of the row is reached, but has its direction of travel reversed.

Arranged between the rear ends of the arms 13 and rigidly secured thereto, is a block 18, shown more clearly in Figs. 1 and 4. This block is provided with a vertical opening 19, preferably formed square in cross-section. Mounted to move vertically within the opening 19 is a standard 20, having gear teeth 21 formed upon one side thereof. These gear teeth are engaged by a gear or pinion 22, rigidly mounted upon a shaft 23. The shaft 23 is journaled through a stationary bearing 24 and is provided with a crank 25, for turning it. It is thus apparent that means are provided to raise and lower the standard 20. A ratchet wheel 26 is formed integral with the gear wheel 22 and is engaged by a pawl 27, preventing the ratchet wheel from turning in a reverse direction. A combined gage and supporting wheel 28 is mounted within a caster 29, which is pivotally connected with the lower end of the standard 20. The tractor frame 14 supports the forward end of the frame 10, while its rear end is supported by the standard 20 and associated elements.

Secured to the side beams 11 between their ends are bearings 30, pivotally receiving the ends of a transverse shaft 31. The shaft 31 is adapted to turn upon its longitudinal axis and to be shifted longitudinally. The shaft 31 is provided at one end with a longitudinal set of spaced openings or notches 32, which are relatively wide and are adapted to receive the end of a dog 33. This dog is pivoted at 34 and is moved in one direction by a spring 35. The dog 33 and the notches 32 coöperate to lock the shaft 31 against longitudinal movement in the desired adjusted position, while the notches 32 are sufficiently wide to permit of the shaft 31 being turned slightly upon its longitudinal axis when the dog is in a selected notch, by means to be hereinafter described.

Rigidly connected with the shaft 31, between the ends of the same, and preferably cast integral therewith, is a casting or socket 36, having a vertical opening 37, which is preferably square in cross-section, as shown more clearly in Fig. 3.

Mounted within the opening 37 to move vertically therein is a standard 38, having teeth 39 formed upon one side thereof. These teeth are adapted to be engaged by a dog 40, pivoted at 41, and moved in one direction by a spring 42.

Secured to the lower end of the standard 38 are right and left hand plow shares 43 and 44, which are adapted to throw the soil in the same direction, when the machine is driven in opposite directions without being reversed.

Rigidly connected with the casting or socket 36 is a lever 45, having its rear end provided with a pin 46, operating in a slot 47, formed in the forward end of a lever 48. The lever 48 is rigidly connected with a hand lever 49 to be moved thereby. The lever 49 is pivotally mounted upon a support 50, as shown at 51. The support 50 is provided with teeth 52, adapted to be engaged by latch means 53, whereby the lever 49 may be locked in adjustment at the desired angular position. The support 50 comprises legs 54, which are provided at their ends with sleeves 55, rigidly secured thereto. These sleeves slide upon transverse rods 56, rigidly mounted upon the side beams 11, as shown. It is thus apparent that when the shaft 31 is longitudinally adjusted the lever 49 and associated elements will move with it, and by swinging the lever 49, the standard 38 may be angularly adjusted, thus moving the point of one plow share toward the ground, and raising the point of the other plow share.

The means to move the shaft 31 longitudinally comprises a lever 57, pivoted to a support 58, as shown at 59. The support 58 is rigidly mounted upon the block 18. Between its ends the lever 57 is provided with a frame 60, receiving the upper end of the standard 38, which is preferably cylindrical. The sides of this frame 60 are provided with longitudinal slots 61, receiving trunnions 62, rigidly secured to the upper end of the standard 38. The lever 57 is employed to raise and lower the standard 38 and to shift the same horizontally.

In the use of the apparatus, as shown in Fig. 5, the plow may be propelled to the right, thus plowing a furrow 63. When the end of the furrow is reached, the plow is stopped. The standard 38 is elevated to move the plow shares 43 and 44 out of contact with the soil, the standard 21 and associated elements suitably supporting the rear end of the frame 10. The lever 57 is moved to the right, whereby the shaft 31 and associated elements are shifted to the right a suitable distance, to bring the plow share 43 at a suitable point for plowing the next furrow 64. The shaft 31 is now locked in its new adjusted position. The driving means of the tractor is now reversed and the tractor travels down the furrow 63 and the plow share 43 plows the new furrow 64. When the end of the furrow 63 is approached, the tractor is steered laterally and the tractor and plow are brought at the end of a third furrow 65, which is cut when the tractor is again propelled to the right, the shaft 31 being first shifted to the left.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. In a plow of the character described, a suitably supported frame, a standard pivotally connected with the frame to be tilted in the line of draft, right and left plow shares carried by the lower portion of the standard and arranged in end to end relation with their cutting ends disposed remote from each other, means connected with the frame and secured to the standard to travel therewith and serving to shift the standard laterally and move the same vertically with respect to the frame, and means connected with the frame and secured to the standard to travel therewith during its lateral movement and adapted to tilt the standard in the line of draft.

2. In a plow of the character described, a suitably supported frame provided in its sides with bearings, a shaft mounted to slide in the bearings and having a socket formed therein, means to shift the shaft longitudinally and lock the same in adjustment at a desired position, a standard mounted within the socket and adapted to be moved longitudinally, means to move the standard and lock the same in adjustment at a desired position, and a plow share carried by the standard.

3. In a plow of the character described, a suitably supported frame provided at its sides with bearings, a shaft mounted to slide in the bearings and having a socket formed therein, means to shift the shaft longitudinally and lock the same in adjustment at a desired position, a standard mounted within the socket and adapted to be moved longitudinally therein, means to move the standard longitudinally and lock the same in adjustment at a desired position, a lever connected with the shaft to turn it upon its longitudinal axes, means to angularly adjust the lever and lock the same in a desired position, and a plow share carried by the standard.

4. In a plow of the character described, a suitably supported frame, a standard pivotally connected with the frame to be angularly adjusted in an approximately vertical plane extending longitudinally of the frame, right and left hand plow shares carried by the lower portion of the standard and arranged in end to end relation with their cutting ends disposed remote from each other, means to shift the standard laterally, and means connected with the standard to travel therewith during its lateral movement and adapted to angularly adjust the same.

5. In a plow of the character described, a suitably supported frame, a standard pivotally connected with the frame to be angularly adjusted in an approximately vertical plane extending longitudinally of the frame and be shifted transversely of the frame, right and left hand plow shares carried by the lower portion of the standard and arranged in end to end relation with their cutting ends disposed remote from each other, means to shift the standard laterally, a guide connected with the frame and extending transversely thereof, a carriage mounted to slide upon the guide, and a lever pivoted upon the carriage and connected with the standard to angularly adjust it.

6. In a plow of the character described, a suitably supported frame, a transverse shaft pivotally connected with the frame to turn upon its longitudinal axes and move longitudinally with relation to the frame, and having a socket, a standard mounted to reciprocate within the socket, a crank connected with the socket, a lever pivotally connected with the frame and having a loose connection with the standard to shift it laterally and move the same vertically with respect to the frame, means to lock the shaft in adjustment at different longitudinal positions, means to lock the standard in adjustment at different vertical positions, plow shares carried by the lower end of the standard, guide means connected with the frame and extending transversely thereof, a carriage mounted to slide upon the guide means, and a bell crank lever pivoted to the carriage and connected with the crank of the socket.

In testimony whereof I affix my signature in presence of two witnesses.

JACOB P. HAFFNER.

Witnesses:
JOHN S. MARTIN,
S. R. GAULT.

Copies of this patent may be obtained for five cents each, by addressing the "Commissioner of Patents, Washington, D. C."